United States Patent [19]

Miyagawa

[11] 4,143,956
[45] Mar. 13, 1979

[54] CAMERA WITH DATE ENTRY

[75] Inventor: Fumihiro Miyagawa, Yokohama, Japan

[73] Assignee: Ricoh Company, Ltd., Japan

[21] Appl. No.: 769,882

[22] Filed: Feb. 18, 1977

[30] Foreign Application Priority Data

| Feb. 26, 1976 | [JP] | Japan | 51-20260 |
| Mar. 9, 1976 | [JP] | Japan | 51-25292 |
| Mar. 9, 1976 | [JP] | Japan | 51-25293 |
| Mar. 9, 1976 | [JP] | Japan | 51-25294 |

[51] Int. Cl.² .................................................. G03B 17/24
[52] U.S. Cl. .................................................. 354/106
[58] Field of Search ............... 354/105, 106, 107, 108, 354/109, 76, 23 D, 60 L, 219; 346/107 A; 352/90

[56] References Cited

U.S. PATENT DOCUMENTS

| 2,282,680 | 5/1942 | Sonne | 354/106 UX |
| 3,148,015 | 9/1964 | Weaver | 354/109 X |
| 3,590,703 | 7/1971 | Ono | 354/106 |
| 3,882,512 | 5/1975 | Lawrence et al. | 354/109 |
| 3,918,076 | 11/1975 | Shono | 354/219 |
| 3,953,868 | 4/1976 | Kawamura et al. | 354/109 |
| 4,001,846 | 1/1977 | Kauneckas | 354/105 |
| 4,001,850 | 1/1977 | Fujita | 354/106 X |
| 4,025,932 | 5/1977 | Miyagawa | 354/106 X |
| 4,035,817 | 7/1977 | Iida | 354/219 |

Primary Examiner—Donald A. Griffin
Attorney, Agent, or Firm—McGlew and Tuttle

[57] ABSTRACT

A camera capable of entering the date a picture is taken onto a film loaded therein comprises a digital date indicator for indicating the same date as the calendar date, an optical system for passing light from the date indicator onto part of the film load and for focussing the light thereon, a sight window for permitting the date indication provided by the date indicator to be viewed from the exterior of the camera, and a light shield which prevents light impinging on the sight window from reaching the film surface when a picture is taken.

10 Claims, 10 Drawing Figures

CAMERA WITH DATE ENTRY

FIELD OF THE INVENTION

BACKGROUND OF THE INVENTION

This invention relates in general to camera systems having date entry features which can automatically place the date onto a frame of film to be exposed when a picture is being taken, and in particular to a camera system having a date entry feature which is automatically set at the proper date.

DESCRIPTION OF THE PRIOR ART

Camera systems are known and commercially available which are capable of placing the date directly onto a frame of film when the film is being exposed to form a picture. Such conventional cameras have date setting wheels for setting the date before each day's use of the camera. These wheels are mounted on the camera and must be manually set. As a result, if the wheels are not set or set incorrectly the wrong date will appear on the picture after it is developed. In professional photography especially, where such dating systems are used to aide in identifying and billing for work done, errors in dating can lead to unnecessary confusion and inconvenience.

SUMMARY OF THE INVENTION

It is an object of this invention to provide a camera with a date entry system which dispenses with the date wheel presetting operation at the time a picture is taken, thus eliminating the possibility that a wrong date will be entered onto the film.

In accordance with the invention, a date indicator which provides a luminescent display of the same date as the calendar is housed within the camera, and light from the date indicator is passed by a suitable optical system to be focussed onto part of a film frame to be exposed. The date indication by the date indicator may be viewed through a sight window from the exterior of the camera while provision is made to shield light which impinges on the sight window from reaching the film surface as the shutter of the camera is opened when taking a picture.

The date indicator which provides a luminescent display of the same date as calendar may comprise the luminescent display of a commercially available digital watch which incorporates luminescent diodes. A day, month and year display may be substituted for the minutes and seconds display, or any combination may be used to give extremely detailed time indication. Since a date indicator of this form has a reduced thickness, it can be advantageously housed within a camera at a suitable location. Also, since the luminescent date display is powered by a source such as a mercury battery, it is possible to maintain the luminescent display function over a period of about 1 year. A separate battery may be used for the date display or a battery already used for the automatic control of the exposure can be utilized. In either case, this system dispenses with the need for presetting the date for an extended period and provides a positive automatic date entry system during that time.

In a conventional camera including date presetting wheels which are manually operated each time a picture is taken, these wheels allow a recognition of a date which is to be entered on the film. Since the camera of the invention dispenses with the date presetting operations as pictures are taken, the recognition of a date which is to be entered on the film is made possible by providing a sight window formed in the outer wall of the camera and through which the date displayed by the date indicator may be viewed either directly or through a small reflecting mirror. In order to prevent the introduction of light from the sight window which may interfere with the photographing process as the film is exposed, a light shield is provided in accordance with the invention to prevent the incident light on the sight window from reaching the film surface.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DETAILED DESCRIPTION OF THE PREFERRED EMBODIMENTS

Figure 1:
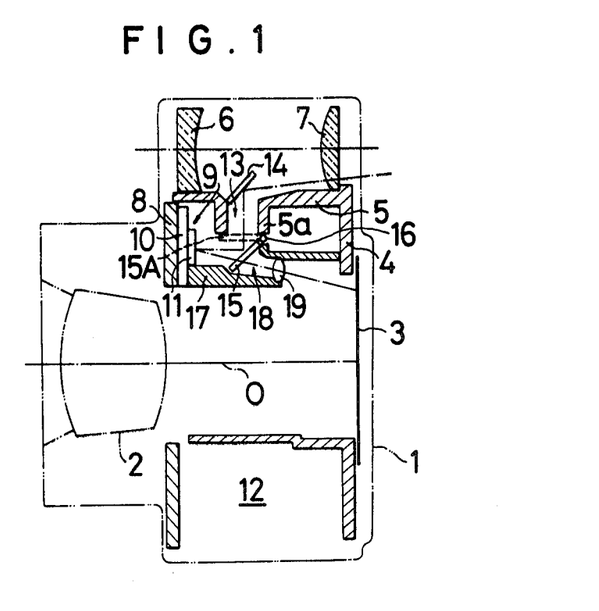
FIG. 1 is a schematic cross section of a camera with date entry constructed in accordance with one embodiment of the invention.

Referring to FIG. 1, a phantom line 1 indicates the contour of a camera as it is viewed from one side. As shown, the camera includes a taking lens 2 and a film 3. A camera body 4 includes an upper shelf 5 on which is disposed a viewfinder of a known form, which comprises a concave objective lens 6 and a convex eyepiece 7. Disposed inside a front wall 8 of the camera is a date indicator generally designated 9, which is disposed substantially in the vertical position relative to the optical axis O of the taking lens. The date indicator 9 comprises a substrate or circuit means 10, a date display 11 having arranged luminescent diodes disposed thereon, and an integrated circuit diode control on the substrate. Luminescent date display 11 comprises a plurality of data portions to show i.e. DAY, MONTH and YEAR. A source battery associated with the date indicator 9 is removably contained in a suitable space 12 in the bottom of the camera body. A separate battery can be used for the date indicator 9, or alternatively a battery which is usually provided for the purpose of automatic exposure control may be used for this purpose. The date indicator 9 is of a conventional digital watch type with known circuitry.

The upper shelf 5 is formed with a downwardly depending sleeve 5a having a short length and defining an opening 13, above which is disposed a stationary mirror 14 and below which is disposed a movable mirror 15 which also serves as a light shield. Using mirrors 14 and 15, date display 11 may be viewed through eyepiece 7 which acts as a sight window. The movable mirror 15 has its upper end pivotally mounted at 16, and, when it has moved upwardly into a position shown in phantom line 15A, it closes the lower opening of the sleeve 5a to prevent the passage of light from the viewfinder into the chamber of the date indicator. When the movable mirror 15 assumes the inclined downward position shown, it prevents the incident light from the viewfinder from passing through an opening 18 formed in a middle shelf 17 and a date focussing lens 19 to reach the film 3. Opening 18 with lens 19 define an optical means for focusing the luminescent display 11 onto the film 3.

When taking a picture, the movable mirror 15 is located in the position 15A shown in phantom line so that the date can be entered onto the film. The date display of the indicator 9 is activated for a brief time at this point and the light output therefrom is focussed by the lens 19 onto part of the film adjacent its upper margin. The date display, which comprises luminescent diodes, is activated at a timing which may be before or after the shutter operation of a bladed shutter and which precedes the initiation of the running of the second blind for a focal plane shutter. Thus, it is desirable that the luminescence of the date display be initiated by a closure of a switch during the initial phase of depressing a shutter button for a bladed shutter, or by closing such switch in timed relationship with the initiation of running of the first blind for a focal plane shutter. It will be noted that such switch corresponds to the switch of a digital watch which may be operated to cause the luminescence of the date display for a brief time, with the display being automatically deactivated subsequently.

To check the date which is to be entered onto the film, the movable mirror 15 may be placed in the inclined position shown and the viewfinder may be viewed while closing the switch. Such a date recognizing switch may be closed in ganged relationship with the movement of the movable mirror 15 to the inclined position or may be closed by a separate date recognizing pushbutton. Alternatively, such date recognizing switch may be closed as the shutter button is partially depressed.

The movable mirror 15 may be biased by a spring or the like, to rotate clockwise so that it normally assumes the upper position and can be placed in the lower position by externally operating the pivot 16. Alternatively, the movable mirror may be constructed to assume the lower position normally, but is displaced to the upper position in ganged relationship with the depression of the shutter button. The indicator 9 with the optical means and date adjustment means to be described, comprises a date entry device for the camera.

Figure 2:
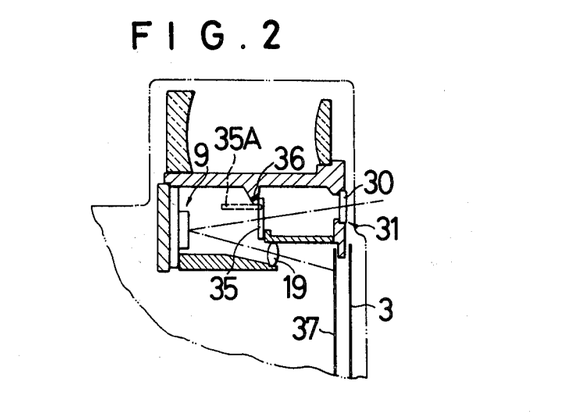
FIGS. 2 to 4 are similar cross sections of other embodiments of the invention.

The recognition or checking of the date may be made through a separate recognition window rather than through the viewfinder. FIG. 2 shows an embodiment in which the mirror for allowing the recognition of a date is removed and an arrangement is made to permit a direct viewing of the date indicator. In this Figure, a sight window 31 is provided in the rear wall of the camera body at a position which permits a viewing of the date indicator 9. The window 31 comprises a transparent panel fitted into the rear wall. A light shield 35 is disposed between the window 31 and the date indicator 9 to prevent the passage of light incident on the window 31 into the chamber of the date indicator. The light shield 35 has its upper end swingably mounted at a pivot 36, and when a date is to be recognized, it is moved to a recognizing position shown by phantom line 35A. By providing a date recognizing switch which is closed with the movement of the light shield 35 to the recognizing position, the date display can be immediately recognized. When the light shield 35 is in the position 35A, the incident light on the sight window 31 may enter the dark chamber within the camera through the focussing lens 19, but cannot have an adverse influence upon the film for a focal plane shutter since the front surface of the film is covered by the shutter blinds. However, to prevent an adverse influence of the incident light on the window 31 with a bladed shutter camera, it is necessary that the focussing lens 19 be shielded before the light shield 35 is placed in the recognizing position. The provision of such means may be suitably chosen by a designer depending on whether a bladed shutter or a focal plane shutter is used. Numeral 37 in FIG. 2 represents a focal plane shutter.

Figure 3:
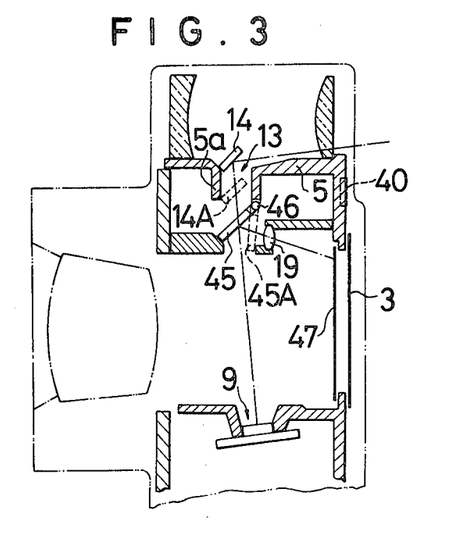

The location of the date indicator is not limited to the inside of the front camera wall, but may be suitably located within the camera body. FIG. 3 shows a further embodiment in which the date indicator 9 is disposed in the bottom of the camera body. Light emanating from the date indicator 9 and carrying date information is focussed onto part of the film 3 adjacent its upper margin, by a movable mirror 45 and a focussing lens 19. The movable mirror 45 is disposed in the top portion of the camera and also serves as a light shield. In this instance, incident light on the viewfinder cannot reach the film since it is intercepted by the movable mirror. The movable mirror 45 has its upper end swingably mounted on a pivot 46, and when it is placed in a recognizing position shown by phantom line 45A, the luminescent date display by the date indicator 9 can be viewed through the opening 13 in the upper shelf 5, stationary mirror 14 and the viewfinder. In this embodiment, a mirror and a focussing lens are used to focus light carrying date information onto the film, and hence numerals on the date indicator are formed in inverted position so that they are recorded as erect images on the film. Numeral 47 in FIG. 3 represents a focal plane shutter.

In the embodiment of FIG. 3 it is also possible to provide a window which is separate from the viewfinder for permitting a recognition of the date to be entered. By way of example, the stationary mirror 14 may be transposed to a position indicated by phantom line 14A, with a window 40 formed in the rear wall of the camera. It should be understood that the sleeve 5a extending from the upper shelf 5 is removed in this modification.

Figure 4:
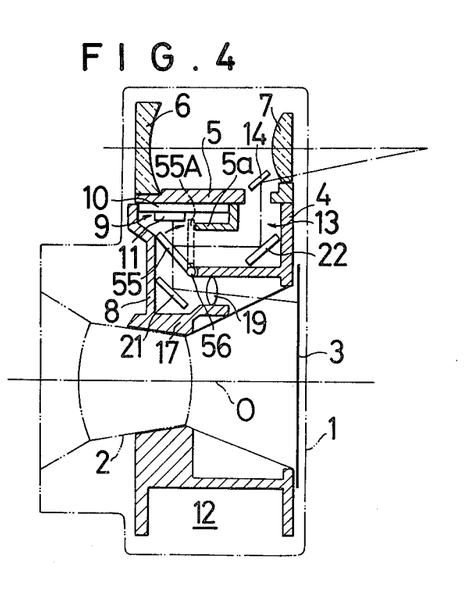

FIG. 4 shows still another embodiment in which the date indicator 9 is disposed on the lower surface of the upper shelf 5. Light emanating from the date indicator 9 and bearing date information is reflected by a stationary mirror 21 disposed in the corner defined by the front camera wall 8 and the middle shelf 17, and is then focussed by the lens 19 onto part of the film 3 which is adjacent the upper margin thereof. The sleeve 5a extending downwardly from the upper shelf 5 and then extending toward the front of the camera has a pivot 56 on its front end on which a movable mirror 55 is swingably mounted. When the mirror 55 assumes a position indicated by phantom line 55A, it closes the front opening of the sleeve 5a to prevent incident light on the viewfinder from reaching the film. When movable mirror 55 assumes an inclined position shown in solid line, the luminescent date display from the date indicator 9 can be viewed through the viewfinder along a path including the movable mirror 55, a stationary mirror 22 disposed at the bend of the sleeve 5a, the stationary mirror 14 disposed at the upper opening of the sleeve 5a and the eyepiece 7. In this instance, incident light on the viewfinder is intercepted by the movable mirror 55 and cannot reach the film 3.

In the camera with date entry described thus far, when a source battery is loaded for the first time or is replaced by a fresh battery, it is necessary to adjust the date display provided by the date indicator 9 so that it coincides with the calendar date. Such date adjustment can be made in a similar manner as in a digital watch. For example, a small pushbutton for adjusting the year, month or day may be provided on the camera at a suitable location for purpose of date adjustment. If the pushbutton is externally mounted on the outer surface of the camera, a casual contact of the pushbutton by hand may result in a disorder of the date indication. To prevent this, the camera may be provided with a chamber devoted for receiving the pushbutton and which is closed by a detachable cover. Such an arrangement however is not desirable from the standpoints of the appearance and small size design of the camera. This also disadvantageously limits the degree of freedom in the deposition of other operational members.

Figure 5:
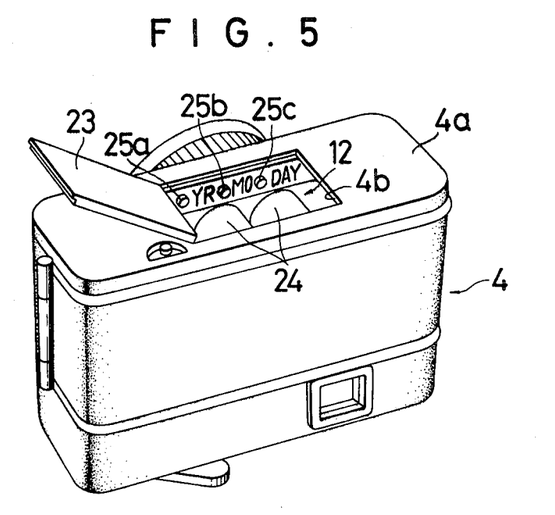
FIG. 5 is a perspective view of a date adjusting apparatus which may be added to the camera of the invention, with the camera shown in an inverted position.

Such inconvenience can be overcome by employing a date adjusting means or apparatus as indicated in FIGS. 5 to 10. Referring to FIG. 5, the camera body 4 includes a bottom wall 4a in which a window 4b is formed at a position corresponding to a battery receiving chamber generally designated 12. A lid 23 is hinged to one side of the window 4b. The chamber 12 is adapted to receive a given number of batteries 24, and three pushbuttons or selective switching means 25a, 25b, 25c project from a side-wall of the chamber 12. Pushbutton 25a is adapted to operate an adjusting switch which is connected in the "year" adjusting circuit of the diode control of the date indicator 9, and pushbutton 25b is adapted to operate an adjusting switch in the "month" adjusting circuit thereof. Finally, pushbutton 25c is adapted to operate an adjusting switch in the "day" adjusting circuit. It should be understood that these adjusting circuits may be similar in arrangement to those used in a digital watch. It will be noted in FIG. 5 that these buttons are designated by letters "year", "month" and "day", respectively.

Assuming that the "year" indication of the date indicator is different from the year of the calendar, the lid 23 of the battery receiving chamber 12 is opened and the pushbutton 25a depressed. This actuates the "year" adjusting circuit in the diode control of the date indicator to advance the numeral indication in the "year" section of the date display 11 by one. The depression and release of the pushbutton 25a may be repeated until the "year" indication coincides with the year of the calendar. The "month" or "day" indication may be adjusted by repeatedly depressing and releasing the button 25b or 25c in the similar manner. After the adjustment, the lid 23 is closed, whereby the pushbuttons cannot be operated inadvertently.

Figure 6:
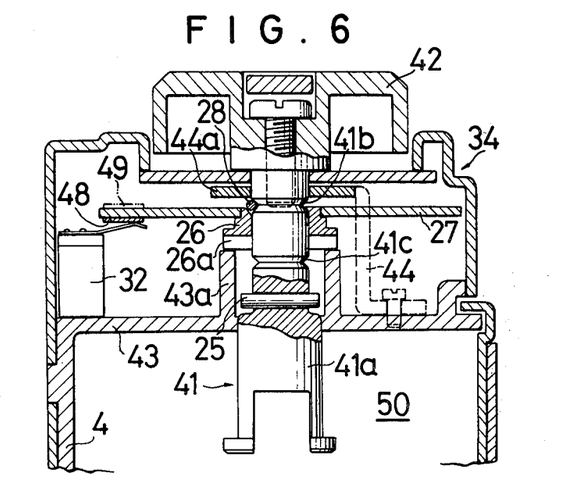
FIG. 6 is a cross section showing another form of the date adjusting apparatus.
Figure 7:
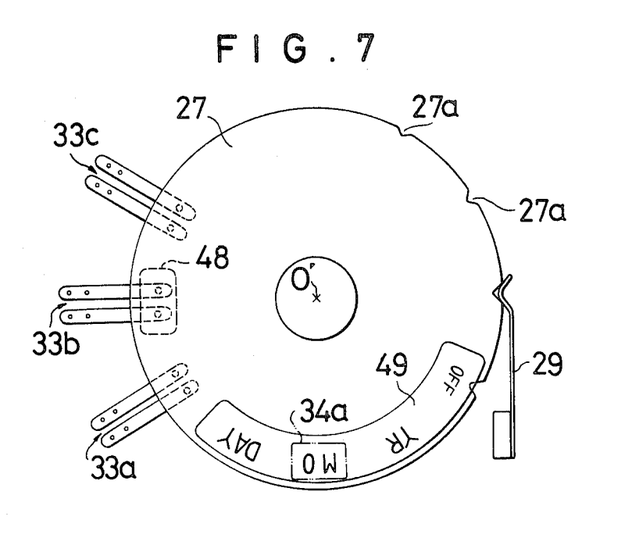
FIG. 7 is a plan view of an adjusting site selection member contained in the apparatus of FIG. 6.
Figure 8:
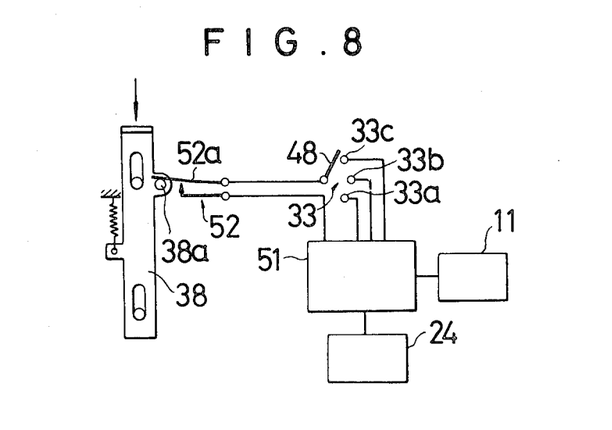
FIG. 8 is a circuit diagram of an electrical circuit which may be used in the apparatus of FIG. 6.

The date adjusting apparatus may be assembled into a film rewind mechanism of the camera as shown in FIGS. 6 to 8. In FIG. 6, the camera body 4 is formed with a chamber 50 which is filled with a film cartridge. A film rewind shaft generally designated 41 extends into the chamber 50, with a film rewind knob 42 threadably mounted on the top of the rewind shaft 41. The film rewind shaft 41 includes a lower portion 41a of an increased diameter which loosely fits in a sleeve 43a of a short length and extending upwardly from an upper shelf 43 of the body 4. The upper portion of the shaft 41 loosely extends through a horizontal piece 44a of an angular plate 44 which expands upward from the upper shelf 43. In this manner, the shaft 41 is supported in a rotatable and axially slidable manner. As the shaft 41 moves vertically or rotates, a pin 25 extending horizontally through the shaft and secured thereto also freely moves in the vertical direction and rotates within the sleeve 43a. A boss 26 which is loosely fitted over the shaft 41 is disposed on top of the sleeve 43a, and its axial sliding movement is blocked by suitable means such as a click spring 28 engaging a peripheral groove 41b or 41c in the shaft 41 and interposed between the horizontal piece 44a of the angular plate 44 and the boss 26. The lower face of the boss 26 is formed with a diametrically extending groove 26a which can be engaged by the pin 25. The selective switching means in chamber 12 of FIG. 5, takes the form of an adjusting site selection member 27 which is coaxially secured to the upper periphery of the boss 26. The shaft 41 is formed with a pair of vertically spaced peripheral grooves 41b, 41c, and the click spring 28 normally engages the upper groove 41b to maintain the shaft 41 in its lower position. However, when the knob 42 is pulled up, the click spring 28 is engaged by the lower groove 41c in the shaft 41, which is therefore temporarily maintained in its upper position. At this time, the pin 25 fits in the groove 26a formed in the boss 26.

As shown in FIG. 7, the selective switching means or selection disc 27 is peripherally formed with a suitable number of notches, for example, four notches 27a in the example shown, which may be selectively engaged by a click spring 29, thereby locking the disc 27 against rotation. On its lower surface, the selection disc 27 is printed with a conductive area or piece 48 at a suitable location. A selection indicating sheet 49 having designations "off", "year", "month" and "day" spaced at the same spacing as that of the notches 27a is applied to the periphery of the upper surface of the disc 27. As shown in FIG. 6, a block 32 stands uprightly from the upper shelf 43, and three pairs of switch contacts 33a, 33b, 33c (see FIG. 7) are insulatedly secured to the block so as to extend radially toward the disc with the same angular spacing as the notches 27a. The free ends of these switch contacts extend into abutment against the lower surface of the selection disc 27 and lie on the path of movement of the conductive area 48, thereby forming switches which select the "year", the "month" or "day" adjusting circuit. Except for the knob 42, the assembly thus constructed is covered by a decorative frame generally designated 34, which is formed with a small sight window 34a (see FIG. 7) in alignment with the selection indicating sheet 49. When the disc 27 assumes an angular position in which the designation "off" appears through sight window 34a, the conductive area 48 is engaged by none of the switch contacts. When the disc 27 assumes a position such that the designation "year" appears through the sight window 34a, the switch contacts 33c are closed by the conductive piece. Similarly, the switch contacts 33b or 33a are closed by the conductive piece 48 when the designation "month" or "day" appears through the sight window 34a.

FIG. 8 shows the electrical circuit of the date adjusting apparatus including the luminescent date display 11.

Specifically, a control circuit 51 is shown connected with the battery source 24 and which includes selective adjustment circuit means connected to respective date portions of the date display 11. The conductive area is shown at 48, forming a selection switch generally designated 33 with one of the switch contacts 33a, 33b, 33c. Switches contacts 33a, 33b, 33c are connected to respective selective adjustment circuit means in control circuit 51. A normally closed date adjusting switch 52 is connected in series with the selection switch 33. In the position shown, the switch 52 is held open by having its movable contact 52a pushed up by a pin 38a fixedly mounted on an adjusting lever 38 which is arranged to be slidable in the vertical direction and which is biased in the upward direction by the resilience of a spring. When the date indication of the date indicator does not coincide with the calendar, the film rewind knob 42 may be pulled up to move its integral film rewind shaft 41 upwardly, whereby the click spring 28 engages the lower groove 41c formed in the periphery of the rewind shaft 41. The pin 25 carried by the shaft 41 is engaged with the groove 26a in the boss 26. When the knob 42 is turned to rotate the selection disc 27 so that a selected designation, or example, the designation "day" in the event a "day" indication of the date display 11 differs from the calendar, appears through the sight window 34a, the conductive area 48 closes the switch contact 33a. When the adjusting lever 38 (see FIG. 8) is moved down, the switch 52 is closed to actuate the "day" adjusting circuit in he control 51, thereby advancing the numeral indication of "day" of the date display 11 by one. When the lever 38 is released, it returns to its original position, opening the switch 52. Thus, by repeatedly depressing and releasing the lever 38, the numeral indication of "day" may be successively advanced.

It will be seen that when it is necessary to adjust the "year" or "month" indication, the knob 42 may be turned so that the designation "year" or "month" appears through the sight window 34a. Thereupon the lever 38 is depressed as before. Each depression of the lever 38 closes the adjusting switch 52, which actuates the "year" or "month" adjusting circuit including the switch contact 33c or 33b, thus advancing the numeral indication of the "year" or "month" by one.

When the adjustment of the date display is completed, the knob 42 is turned until the designation "off" on the selection disc 27 appears through the sight window 34a, whereupon the knob 42 is pushed down to return it and its integral rewind shaft 41 to their original positions shown in FIG. 6. Since none of the switch contacts are engaged by the conductive area 48, an inadvertent depression of the lever 38 to close the switch 52 does not result in shifting an indication of the date.

In addition to the year, month and day, the indication may include an indication of the time of a day or a day of the week with associated indication adjusting switch added. It is desirable that the adjusting lever 38 be normally kept clear of contact by hand as by locating it in a battery receiving chamber with a lid, as illustrated in FIG. 5. The provision of the selection member 27 in coaxial manner with the film rewind shaft permits a common use of an operating member, and avoids a complex arrangement when information being entered is increased while eliminating an inadvertent operation.

Figure 9:
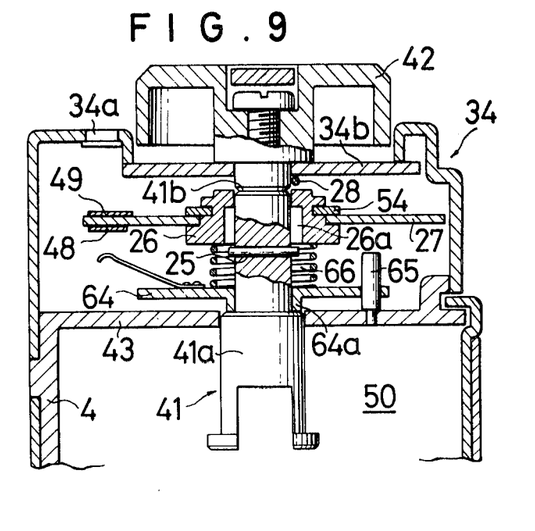
FIG. 9 is a cross section of another form of the date adjusting apparatus.
Figure 10:
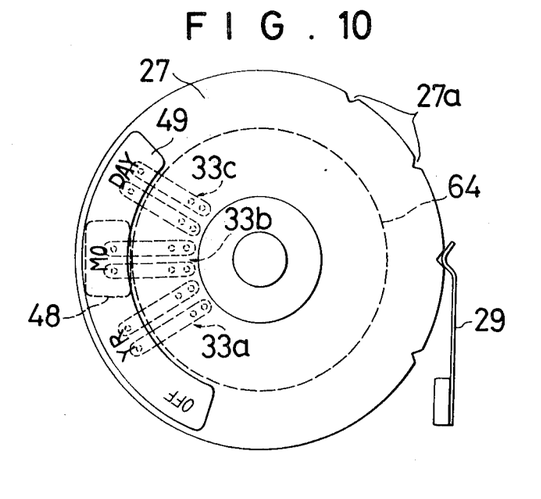
FIG. 10 is a plan view of an adjusting site selection member of the apparatus shown in FIG. 9.

When the date adjusting apparatus is assembled into a film rewind mechanism of the camera, the adjusting site selection switch and the date adjusting switch may be operated through the film rewind shaft, as illustrated in FIGS. 9 and 10. In FIG. 9, the film rewind shaft 41 is supported in a rotatable and axially slidable manner by having its lower portion 41a of increased diameter extending loosely through the upper shelf 43 and having its upper end portion extending loosely through an upper wall 34b of a decorative frame 34 which covers the upper surface of the body 4. Toward the upper end, the film rewind shaft 41 has the boss 26 loosely fitted thereon, and a sliding movement of the boss 26 along the shaft 41 is prevented, while permitting its rotation, by having a plate 54 extending from a suitable stationary part loosely fitted in a peripheral groove in the boss 26. The slot 26a is formed in the lower end face of the boss 26 so as to extend in a vertical plane including the axis there of. The adjusting site selection disc 27 is coaxially secured to the peripheral surface of the boss 26.

As shown in FIG. 10, the selection disc 27 is peripherally formed with four notches 27a at a given spacing, which may be selectively engaged by the click spring 29 to hold the disc 27 in a selected position. The lower surface of the disc 27 is peripherally formed with a conductive area or piece 48 while a selection indicator sheet 49 having the designations "off", "year", "month" and "day" which are spaced apart at the same spacing as the notches 27 is adhesively secured to the upper peripheral region of the disc 27. A sight window 34a is formed in the decorative frame 34 at a position corresponding to the selection indicator plate 49 (see FIG. 9).

Toward the upper end, the shaft 41 is formed with a peripheral groove 41b, and a pin 25 is secured to a lower portion thereof by diametrically extending therethrough. When the film rewind knob 42 is depressed to its full extent as shown in FIG. 9, the pin 25 is located below the lower end face of the boss 26, but when the knob 42 is slightly pulled up and temporarily maintained in such position by the engagement of the peripheral groove 41b with the click spring 28, the pin 25 engages the slot 26a in the boss 26. The shaft 41 can be pulled up or raised to another position above the temporary position mentioned above. A switch contact carrying disc 64 is loosely fitted on the shaft 41 intermediate the large diameter portion 41a and the boss 26, and is only allowed to move vertically while its rotation is prevented by a pin 65 extending from the upper shelf 43 which vertically extends through the disc 64. The disc 64 is biased to move downward by a coiled spring 66 interposed between the disc 64 and the boss 26, but the resulting movement is limited by the abutment of the end face of a sleeve 64a depending downwardly from the periphery of an axial bore of the disc 64 against a step formed at the upper end of the large diameter portion 41a of the shaft 41. Three pairs of switch contacts 33a, 33b, 33c (see FIG. 10) are secured to the upper surface of the disc 64 and extend radially at the same angular spacing therebetween as the angular spacing between the notches 27a. The free end of these switch contacts extends above the path of rotation of the conductive area 48. The conductive area 48 forms, together with the switch contacts 33a, 33b, 33c, date adjusting switches. In an angular position of the disc 27 in which the designation "off" appears through the sight window 34a in the frame 34, the conductive piece 48 is located out of alignment with any of the switch contacts. When the designation "year" appears through the sight window 34a, the conductive piece 48 is located in alignment with the switch contacts 33c. Similarly, when the designation "month" or "day" appears through the sight window 34a, the conductive piece 48 is located in alignment with either switch contacts 33b or 33a. In the normal position shown in FIG. 9, there is a sufficient spacing between the lower surface of the selection disc 27 and the respective switch contacts 33a to 33c to maintain the lower surface of the disc clear from any of the switch contacts in the first raised position of the shaft 41. However, in the second raised position of the shaft 41, the lower surface of the disc can engage the switch contacts. The individual date adjusting switches are connected in respective date adjusting circuits in the diode control of the date indicator 9 (see FIGS. 1 to 4). When any one of these switches is closed, a numeral indication in the corresponding date indication is advanced by one.

Assuming that the date indication of the date indicator does not coincide with the calendar, the knob 42 is pulled to bring the shaft 41 to its first raised position, causing the pin 25 on the shaft 41 to engage the groove 26a in the boss 26, with the click spring 28 engaging the peripheral groove 41b in the shaft 41. The knob 42 is then turned to rotate the selection disc 27 to choose one of the designations "year", "month" and "day" in which the date indication is wrong so that the selected designation appears through the sight window 34a. For example, when "day" is wrong, the selection disc 27 is turned to cause the designation "day" to appear through the sight window 34a. This brings the conductive piece 48 into alignment with the switch contacts 33a. When the knob 42 is pulled further upward to bring the shaft to its second raised position, the conductive piece 48 moves into contact with the switch contacts 33a to close an electrical circuit therebetween, thereby actuating "day" adjusting circuit in the diode control of the date indicator. Thus, a numeral indication for "day" in the date indication of the date indicator 11 is advanced by one. When the knob 42 is returned to a position corresponding to the first raised position of the shaft 41, the electrical contact between the conductive piece 48 and the switch contacts 33a is interrupted. If it is desired to further advance the numeral indication for "day", the knob 42 may be reciprocately moved between the first and second raised positions, thus successively advancing a numeral indication for "day".

When it is desired to correct a numeral indication for "year" or "month", the knob 42 is pulled up to its first raised position and then turned until the designation "year" or "month" appears through the sight window 34a. When the knob 42 is pulled up to its second raised position, the conductive piece 42 completes an electrical connection between the switch contacts 33c or 33b, thereby completing "year" or "month" adjusting circuit to advance a numeral indication for "year" or "month" by one.

After completion of the date adjustment, the knob 42 is placed in its first raised position and rotated until the designation "off" on the selection disc 27 appears through the sight window 34a, followed by a downward depression of the knob to return the knob and its integral rewind shaft 41 to their original positions shown in FIG. 9. Since the conductive piece 48 is now out of alignment with any of the switch contacts, an inadvertent upward movement of the knob 42 to the second raised position does not result in shifting the date indication.

It is to be understood that the purpose of pulling up the film rewind shaft in the camera having the adjusting apparatus as illustrated in FIGS. 6 to 10 is to provide an adjustment of the date indication, in addition to achieving an insertion or removal of a film patrone as in a usual camera. Hence, with the camera having the adjusting apparatus assembled therein, it may be necessary to provide a notch in the bottom of the patrone chamber 50 for the insertion or removal of a patrone.

While specific embodiments of the invention have been shown and described in detail to illustrate the application of the principles of the invention, it will be understood that the invention may be embodied otherwise without departing from such principles.

What is claimed is:

1. A date entry device for a camera containing film comprising, a digital watch type date indicator within the camera having a luminescent date display for displaying the day, month and year corresponding with the calendar date, and optical means for passing light emanating from said luminescent date display of said date indicator to the film and focusing the light on the film, a sight window in the camera for permitting the luminescent date display to be viewed from outside the camera, and a light shield comprising a mirror for preventing incident light on said sight window from reaching the film when a picture is being taken.

2. A date entry device according to claim 1, wherein the camera further includes a viewfinder having an eyepiece, said sight window comprising the eyepiece.

3. A date entry device for a camera comprising a digital watch type date indicator in the camera having a luminescent date display for displaying the calendar date, and optical means associated said luminescent date display for passing the light of said luminescent date display from said luminescent date display to a film in the camera, a sight window for permitting a viewing of said luminescent date display from outside said camera, a light shield for preventing incident light on said sight window from reaching the film when a picture is being taken, and a date adjusting means for adjusting the luminescent date display of said date indicator, the camera including a battery receiving chamber with a closing lid, said adjusting means disposed within said battery receiving chamber.

4. A date entry device for a camera with film comprising, a date indicator having a luminescent date display of the same date as the calendar date, and optical means associated with said date indicator for passing light from said luminescent date display to be focused onto a portion of the film, a sight window associated with said date indicator for permitting a viewing of said luminescent date display from outside of the camera, a light shield for preventing incident light on said sight window from reaching the film when a picture is being taken, selective switching means connected to said date indicator for selecting a portion of said luminescent date display which requires an adjustment, and an adjustment switch connected in series with said selective switching means, the camera including a film rewind shaft and said selective switching means comprising a selection member disposed in coaxial relationship with the film rewind shaft.

5. A date entry device according to claim 4, wherein said selection member is adapted to be connected with the film rewind shaft when the film rewind shaft is pulled upwardly.

6. A date entry device for a camera with film comprising, a digital watch type data indicator having a luminescent date display of the same date as the calendar date, and optical means for passing and focusing light from said luminescent date display to a portion of the film, a sight window associated with said date indicator for permitting a viewing of said luminescent date display from outside of the camera, a light shield associated with said sight window for preventing incident light on said sight window from reaching the film when a picture is being taken, the camera including a film rewind shaft, a selection member rotatably disposed about the film rewind shaft, the rewind shaft being movable to a first and second position, said selection member being rotatable with the rewind shaft when it is moved into said first raised position for selecting a portion of the luminescent date display which requires an adjustment, a conductive area on said selective member and non-rotatable switch contacts engaged on said rewind shaft engageable with said conductive area when the rewind shaft is in said second raised position.

7. A date entry device for placing the calendar date on a portion of film within a camera comprising, a date indicator in the camera having a luminescent date display showing the calendar date in a plurality of date portions, said date indicator including circuit means for automatically changing said luminescent date display with the calendar date, optical means in the camera associated with said date indicator for focusing the light from said luminescent date display onto a portion of the film, and date adjustment means connected to said date indicator for manually adjusting said date portions of said luminescent date display, said date adjustment means comprising, selective circuitry means connected to each of said date portions of said luminescent date display for selectively changing the date portions, a selection disc rotatably mounted on the camera, a conductive area on said selection disc, switch contacts respectively connected to each of said selective adjustment circuit means mounted adjacent said selection disc in the camera, said conductive area being selectively positionable adjacent one of said switch contacts, and an adjusting switch connected between said switch contacts and said selective adjustment circuit means for activating said selective adjustment circuit means and changing the date portion connected to the selected selective adjustment circuit means.

8. A date entry device according to claim 7, further including date viewing means comprising sight window means in the camera for viewing said luminescent display from outside of the camera, and movable light shield means mounted in the camera, movable from a viewing position for allowing said luminescent display to be visible from outside of the camera through said window means, to a date entry position for allowing the light from said luminescent display to be focussed on the film by said optical means and preventing light from said sight window means from striking the film.

9. A date entry device according to claim 7, wherein the camera includes a film winding shaft, said selection disc being connected to the film winding shaft.

10. A date entry device for a camera containing film comprising, a digital watch type date indicator within the camera having a luminescent date display for displaying the day, month and year corresponding with the calendar date, and optical means for passing light emanating from said luminescent date display of said date indicator to the film and focusing the light on the film, a sight window in the camera for permitting the luminescent date display to be viewed from outside the camera, and a light shield for preventing incident light on said sight window from reaching the film when a picture is being taken, said light shield comprising a pivotable mirror pivotable between a first position in which the light from said luminescent date display is passed to said optical system and a second position in which said light is passed toward said sight window.

* * * * *